(12) United States Patent
Kolesa et al.

(10) Patent No.: US 7,628,408 B2
(45) Date of Patent: Dec. 8, 2009

(54) SYSTEM AND METHOD FOR MOVING MATERIAL PAST AN OBSTACLE

(76) Inventors: Timothy Kolesa, 650 Poydras St., Suite 2600, New Orleans, LA (US) 70130; Randal Pick, 650 Poydras St., Suite 2600, New Orleans, LA (US) 70130

( * ) Notice: Subject to any disclaimer, the term of this patent is extended or adjusted under 35 U.S.C. 154(b) by 635 days.

(21) Appl. No.: 11/457,486

(22) Filed: Jul. 14, 2006

(65) Prior Publication Data

US 2008/0014066 A1   Jan. 17, 2008

(51) Int. Cl.
*B62B 1/04* (2006.01)
(52) U.S. Cl. ............... 280/47.29; 280/47.27; 280/654; 414/490; 414/540
(58) Field of Classification Search ............ 280/47.23, 280/47.24, 47.27, 47.28, 47.29, 654; 414/44, 414/490, 491, 540, 589, 590; D34/12, 24, D34/26, 27
See application file for complete search history.

(56) References Cited

U.S. PATENT DOCUMENTS

| | | | | | |
|---|---|---|---|---|---|
| 1,827,209 | A | * | 10/1931 | Robbins | 254/3 C |
| 4,728,245 | A | * | 3/1988 | Shelton | 414/490 |
| 5,885,047 | A | * | 3/1999 | Davis et al. | 414/490 |
| 6,095,745 | A | * | 8/2000 | Garnett | 414/427 |
| 6,457,727 | B1 | * | 10/2002 | Tolly | 280/47.28 |
| 6,530,740 | B2 | * | 3/2003 | Kim | 414/490 |
| 6,561,745 | B2 | * | 5/2003 | Rountree | 414/490 |

* cited by examiner

*Primary Examiner*—Paul N Dickson
*Assistant Examiner*—John D Walters
(74) *Attorney, Agent, or Firm*—Andrew G. Vicknair

(57) ABSTRACT

A method and system are disclosed for moving material past an obstacle and/or for moving materials in areas of limited space. A user can move so that the area and space required to move an object is reduced. A user can utilize the system and method to load an object and then tilt the object to be moved so that the area needed to move an object is reduced. After the object has been tilted, a user can move the object in locations characterized by various physical restrictions such as limited height, width, and length dimensions that do not ordinarily allow for movement of larger sized objects.

26 Claims, 4 Drawing Sheets

SYSTEM AND METHOD FOR MOVING MATERIAL PAST AN OBSTACLE

TECHNICAL FIELD

The present invention relates, in general to material movement systems and methods, and more specifically to a system and method for moving material past an obstacle and/or for moving materials in areas of limited space.

BACKGROUND OF INVENTION

Moving objects from one location to another location can be simplified with the use of some type of device, such as a hand cart, a hand truck, a dolly and the like. Such devices are often used everyday in a variety of locations for a variety of purposes, such as in factories, warehouses, offices, outdoors, homes and the like. These hand trucks and carts come in different sizes and shapes, depending on the nature of the object to be moved. For example, when large objects are moved, such as refrigerators, stoves, large boxes and the like, a mover may move the large object and position the large object on the dolly or cart so that the mover can move the large object to the desired destination with the use of the dolly or cart.

Various types of dollys may be used to move objects depending on the object to be moved. For example, a special hand dolly may be used to assist in moving various cylindrical objects such as beverage kegs, liquid filled bottles, pressurized cylinders, and the like. In such a case, the hand dolly may include some type of wall member to prevent the cylindrical object from being dislocated from the hand dolly.

While hand carts, dollys, or trucks are often used to assist a mover in relocating objects, such carts are unable to help a user move objects around or past various obstacles. For example, movement of objects around a jobsite, such as a construction worksite, may be very difficult due to various restrictions imposed by the jobsite, and ordinary hand trucks, dollys and carts provide no solution to the problem. When a building is under construction, it is often difficult to move large items throughout the building, such as moving items from a first floor to an upper floor, due to physical restrictions of the building, such as wall heights, hall way dimensions, door openings, and the like. In such instances, individuals may attempt to move items up elevators that are designed to carry people and not large items.

When individuals attempt to use hand trucks, carts, and dollys to move large items through an area characterized by physical restrictions, such as a building under construction, the individual is presented with many roadblocks and restrictions. For example, the individual attempting to move large items from lower floors of a building to upper floors of a building characterized by limited spaces, may attempt to move the large items in an elevator designed for people. However, the individual will often discover that the large item can not be transported in the limited space, such as the elevator designed for people. Accordingly, the individual ultimately has to move the larger items, to the upper floors by physically carrying the item, without the assistance of a hand truck, dolly or cart, up the stairs, which is very labor intensive, time consuming and dangerous.

Accordingly, a need exists in the art for a system and method that allows individuals to move material past obstacles, and/or for moving materials in areas of limited space, such as those presented by various physical restrictions of the location where the material is being moved.

BRIEF SUMMARY OF THE INVENTION

The present invention is directed to a system and method for moving material past an obstacle and/or for moving materials in areas of limited space. In one embodiment, the present invention provides a tilting bed cart/truck capable of carrying a load neither perpendicular nor parallel to the ground so that the area and space required to move an object is reduced. The tilting bed cart/truck may tilt the object loaded upon it so that the area needed to move an object is reduced. In one embodiment, the present invention enables objects to be moved in locations characterized by various physical restrictions such as limited height, width, and length dimensions that do not ordinarily allow for movement of larger sized objects. In another embodiment, the present invention may be configured so that as objects on the tilting bed cart/truck are tilted or moved in an upward and/or elevated direction, the load center of the object on the tilting bed cart/truck is maintained in order to provide stability to the object as the object is tilted and moved.

In one embodiment of the present invention, the tilting bed cart/truck may be configured so that it includes two base members, wheels, a lifting cylinder, a sliding member, and a holding framework. In such an embodiment, the wheels may be mounted to the two base members to allow the embodiment to be moved around. The sliding member may be configured so that it joins the two base members and allows the base members to move towards one another and allows the base members to move away from one another to ultimately change the length layout of the cart. The holding framework is configured to hold objects to be moved. Accordingly, the holding framework may take the form of any number of shapes or sizes to accommodate the moving of any number of objects, such as furniture, office cubicles, doors, refrigerators, sheet rock, plywood, paneling, and the like. The lifting cylinder may be configured so that it can be mounted to one base member and mounted to the holding framework so that it can move the holding framework in an upward and backward direction, such as tilting the object located on the holding framework in order to reduce the area needed to move an object and de-tilting the object or moving the object in a backward direction when the object has been moved around the obstacle.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying figures, in which.

DETAILED DESCRIPTION OF THE INVENTION

Figure 1:
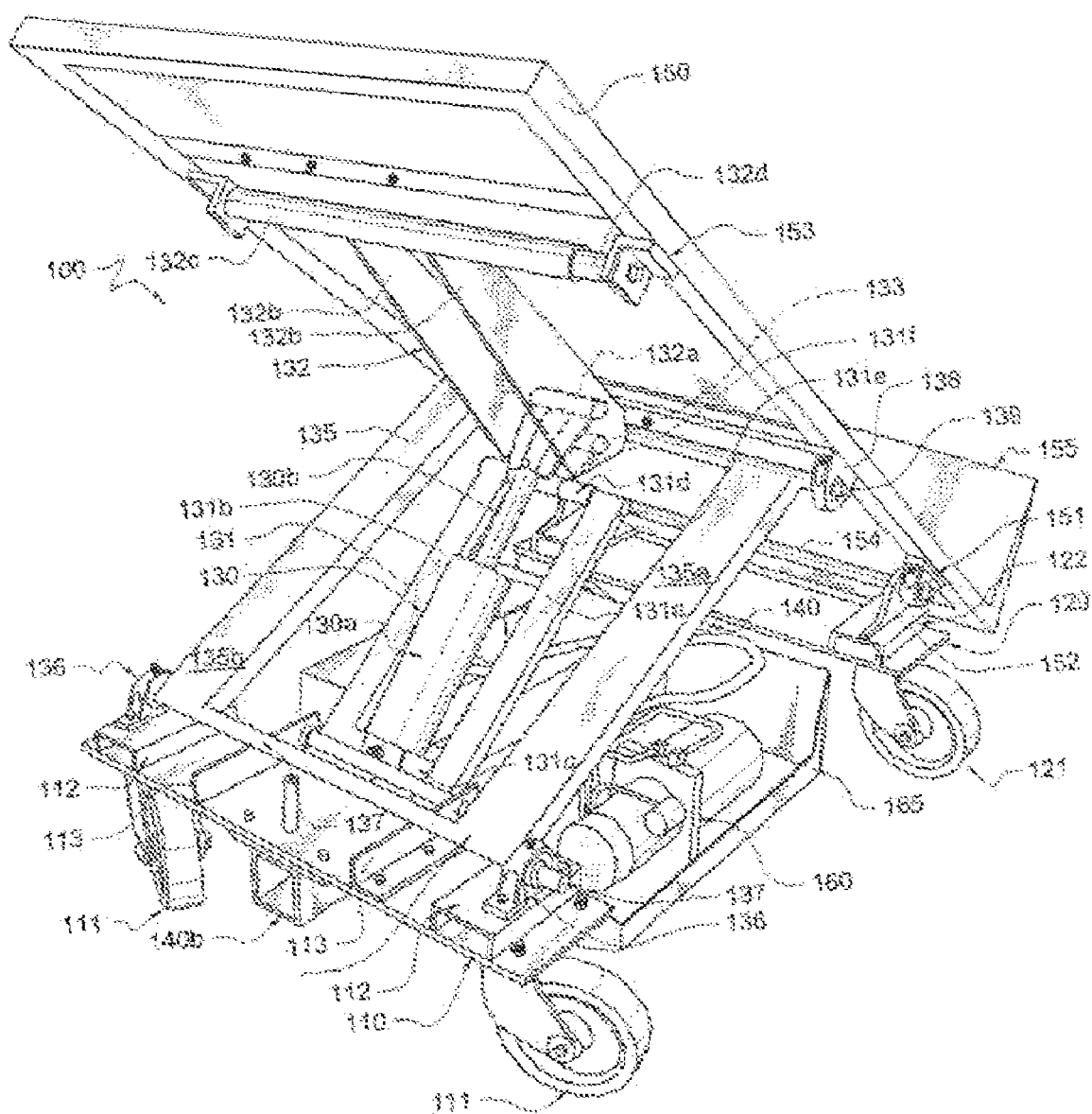
FIG. 1 illustrates a rear view of an embodiment of the present invention.
Figure 2:
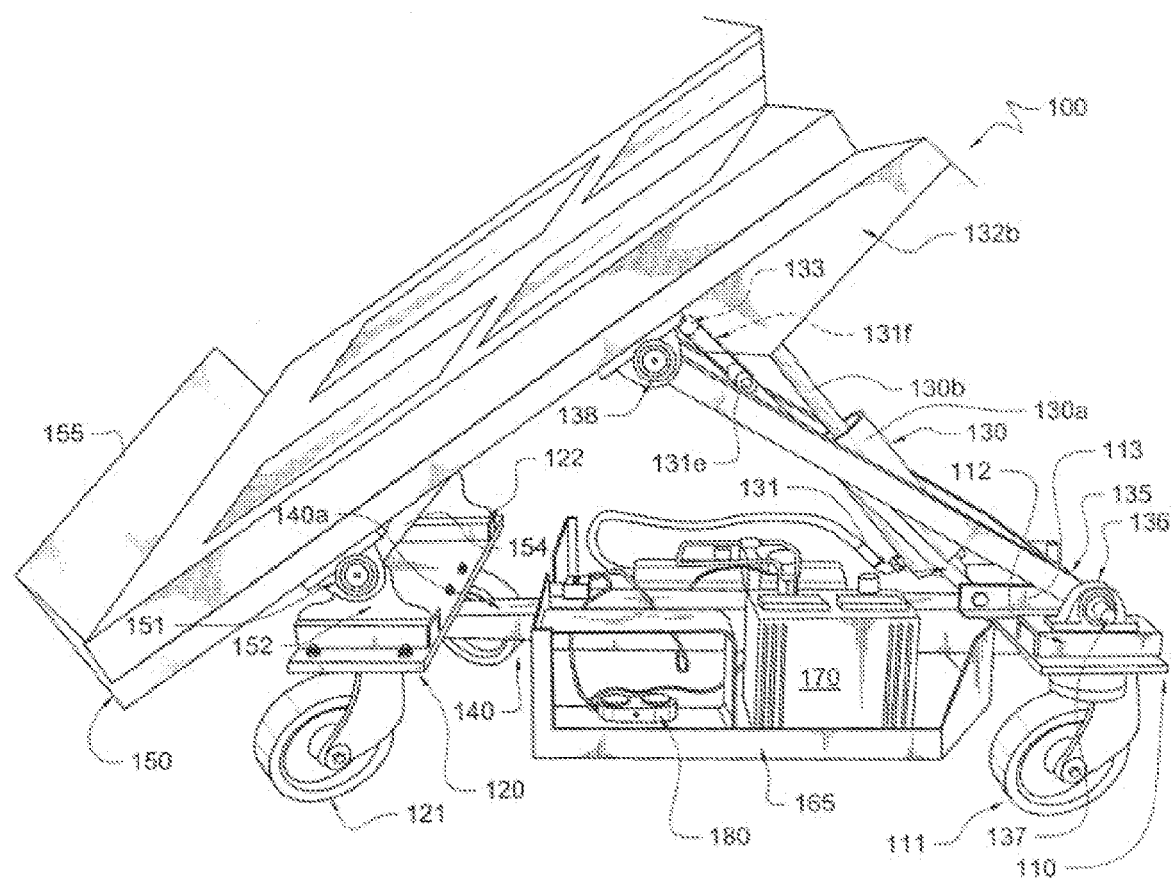
FIG. 2 illustrates a side/frontal view of an embodiment of the present invention with a door located on the embodiment.
Figure 3:
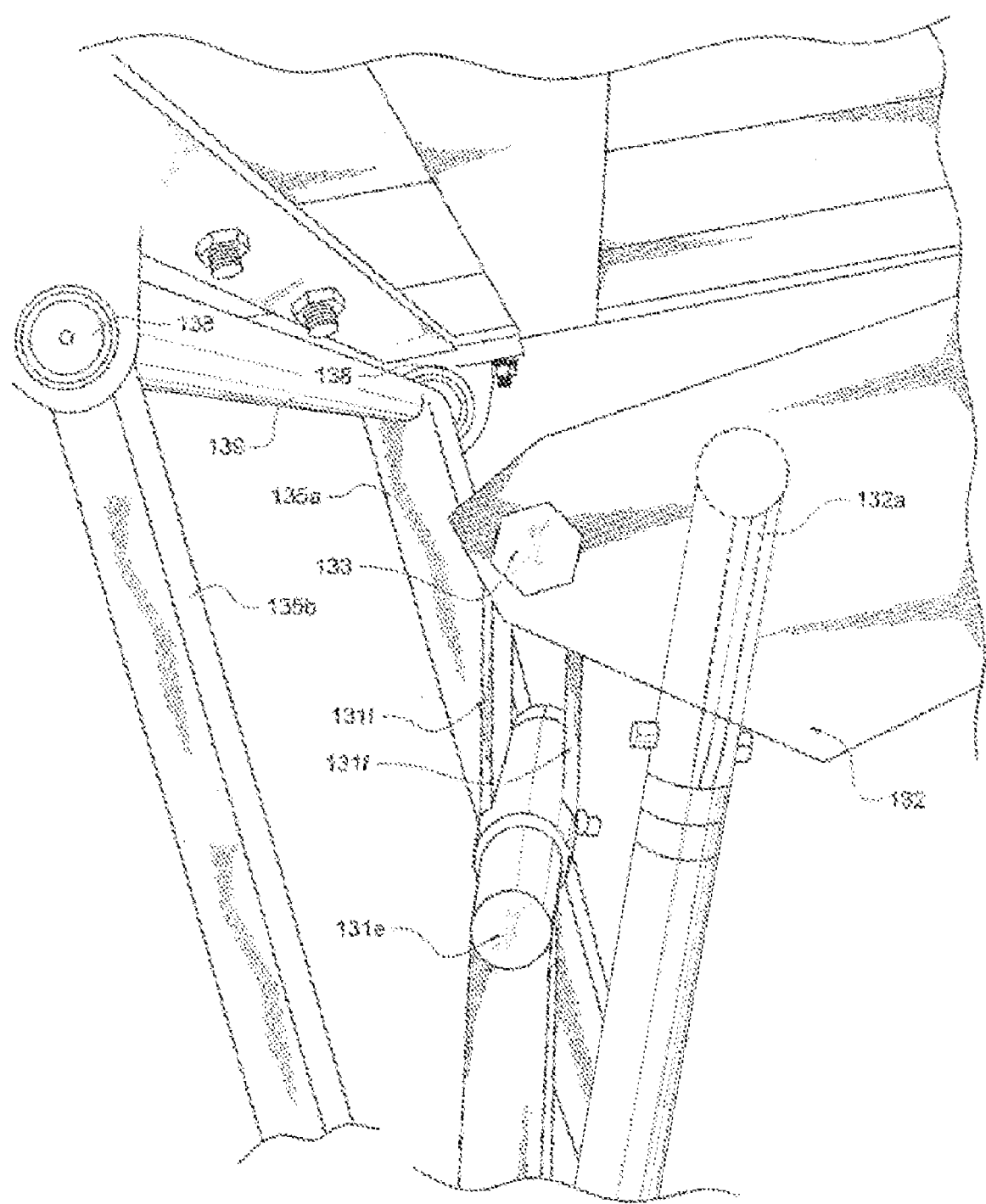
FIG. 3 illustrates a close up view of a portion of an embodiment of the present invention.

A preferred embodiment of a tilting bed-cart/truck adapted according to the present invention is shown generally as tilting bed-cart/truck 100 in FIGS. 1, 2 and 3. FIG. 1 illustrates a rear view of an embodiment of the present invention, FIG. 2 illustrates a side/frontal view of an embodiment of the present invention with a door located on the embodiment, and FIG. 3 illustrates a close up view of a portion of an embodiment of the present invention. Tilting bed-cart/truck 100 includes base member 110, wheels 111, base member 120, wheels 121, lift mechanism 130, framework support 135, mounts 136, mounts 138, sliding mechanism 140, framework 150, framework mount 151, mount member 152, lifting mechanism-framework mount 153, pump 160, power supply 170, and control station 180.

As illustrated in FIGS. 1 and 2, base members 110 and 120 are rectangular shaped. However, the present invention is not limited to this configuration as base members 110 and 120 may take the form of any number of shapes. Wheels 111 mount to base member 110 and wheels 121 mount to base member 120. Wheels 111 and 121 may be swivel wheels, fixed position wheels, or any combination thereof. Such wheels may be of any size, such as three (3) inch diameter, four (4) inch diameter, and the like that are mounted to base members 110 and 120 by any fastening means, such as a screw, bolt, socket, cotter pin, and the like. Wheels 111 and 121 allow tilting bed-cart/truck 100 to move. The present invention may also be configured so that wheels 111 and/or wheels 121 are provided with a brake mechanism to help control movement of tilting bed-cart/truck 100 and some type of motorized device that will automatically move the wheels and thereby moving tilting bed-cart/truck 100.

Base members 110 and 120 may also include mount blocks 112 and 122, respectively. Mount blocks 112 and 122 may be a hollow block of material mounted to base members 110 and 120 which provide a mounting location for various items of the present invention. Mount blocks 112 provide a mounting location for mounts 136 to fasten to and mount blocks 122 provide a location for mount members 152 to fasten to. The present invention is not limited to this configuration as an embodiment may be configured without mount blocks 112 and 122 whereby mounts 136 and mount members 152 would mount directly to base members 110 and 120.

Framework 150 is a tray like device that can receive and hold a variety of objects, such as doors, furniture, office cubicles, sheet rock, building materials, and the like that may be moved by the present invention. Framework 150 is generally a planar surface with an underside and a ledge 155 extending outward that helps keep objects from moving off of framework 150. Framework 150 may be made of any number of various materials, such as metal, plastic, chrome, iron, stainless steel, aluminum, wood, any combination thereof, and the like. Objects that are to be moved by the present invention are placed upon framework 150 and remain on framework 150 throughout the moving process. The present invention may also include a variety of safety belts, clips, straps, and the like that are located near framework 150, so that when an item is placed on framework 150, the straps, belts, and or clips may be used to secure the item to framework 150 and prevent the item from inadvertently sliding off of framework 150. For example, if the present invention were used to move a door, the door would be placed upon framework 150 whereby the door would rest upon framework 150 and may be secured to framework 150 with a safety belt, strap, and or clip until movement of the door is complete.

Framework mount 151 and mount member 152 provide a means in which framework 150 may be mounted to base member 120. Framework mount 151 may be mounted to base member 120 with the use of mount member 152 which may be mounted to base member 120 through mount block 122, and connecting rod 154. Mounting member 152 may be mounted directly to base member 120 or to mount block 122 by any number of fastening means, such as a screw, bolt, socket, cotter pin, and the like. Framework mount 151 may be mounted to framework 150 by any number of fastening means, such as a screw, bolt, socket, cotter pin, and the like. In one embodiment, framework mount 151 may be a mount comprising a base that is physically attached to framework 150 with an upper portion located above the base that has a circular member that allows cylindrical devices, such as rod 154, to fit into the circular member to allow the framework mount 151 to be attached to other objects. Mounting member 152 may be configured so that it comprises a hole to allow cylindrical devices, such as rod 154, to slide through mounting member 152. In one embodiment, rod 154 may be positioned through the hole in mounting member 152 and through the circular member of framework mount 151 thereby connecting mounting member 152 to framework mount 151 which in turn connects framework 150 to base member 120 with the use of rod 154, framework mount 151, and mounting member 152. Framework mount 151 may also include some type of tightening device that functions to secure rod 154 within framework mount 151 so that the connection provided by rod 154, framework mount 151, and mounting member 152 is stable.

Lift mechanism 130 includes cylinder 130a and rod 130b. Lift mechanism 130 operates to lift framework 150 and any object that may be located on framework 150. Lift mechanism 130 may be a hydraulic lift cylinder. However, the present invention is not limited to this configuration as lift mechanism 130 may be any number of devices or systems that are capable of lifting framework 150, such as a manual screw lift device, an air lift device, a chain operated lift device, a hand operated lift device, and the like.

In one embodiment, the present invention also includes lower lift frame 131 and upper lift frame 132 as shown in FIG. 2. Lower lift frame 131 and upper lift frame 132 provide attachment points for lift mechanism 130 that enables lift mechanism 130 to tilt framework 150 when lift mechanism 130 is operated. In one embodiment, the cylinder 130a portion of lift mechanism 130 mounts to lower lift frame 131 and the rod 130b portion of lift mechanism 130 mounts to upper lift frame 132 shown in FIGS. 1 and 3, which enables the tilting of framework 150 via lift mechanism 130.

In one embodiment, as shown in FIG. 1, lower lift frame 131 is a rectangular shaped device comprising right member 131a, left member 131b, bottom member 131c, and top member 131d. Lower lift frame 131 may be mounted to base member 110 through bracket 113. In one embodiment, bottom member 131c of lower lift frame 131 may include a rod or other similar part that is mounted to base member 110 through bracket 113. For example, bracket 113 may contain slots so that a rod member located near the bottom of lower lift frame 131 is mounted within slots of bracket 113 thereby enabling lower lift frame 131 to move when lift mechanism 130 is operated and functioning to move framework 150. However, the present invention is not limited to the use of slots, as lower lift frame 131 may mount to base member 110 in any number of ways, such as the use of a bolt, screw, cotter pin, and the like.

In one embodiment of the present invention, lower lift frame 131 is configured so that it provides a location for lift mechanism 130 to mount to lower lift frame 131. As illustrated in FIG. 1, the cylinder 130a portion of lift mechanism 130 mounts to bottom member 131c of lower lift frame 131 with the use of some type of attachment device or method, such as a screw, a bolt, a permanent fixation by welding, and the like.

Lower lift frame 131 may also be configured in an embodiment so that top member 131d of lower lift frame 131 includes a rod shaped member, such as rod member 131e shown in FIGS. 1, 2, and 3, that connects right member 131a and left member 131b. Lower lift frame 131 may also include link member 131f, illustrated in FIGS. 2 and 3. As illustrated in FIG. 3, link member 131f may be an oblong shaped cylindrical member that connects to rod shaped member 131e and rod shaped member 133 that is connected to upper lift frame 132 as shown in FIG. 3. Link member 131f operates to connect lower lift frame 131 to upper lift frame 132 as shown in FIG. 3 and allows lower lift frame 131 and upper lift frame 132 to move relative to one another when lift mechanism 130 is operating, such as when it is used to move, tilt and/or de-tilt framework 150.

In one embodiment, as shown in FIG. 1, upper lift frame 132 may comprise connecting member 132a, side members 132b, and cylindrical member 132c. Connecting member 132a connects rod 130b of lift mechanism 130 to upper lift frame 132 so that when lift mechanism 130 is operated, any movement by rod 130b will result in movement to connecting member 132a that will ultimately result in movement to any member connected to connecting member 132a, such as upper lift frame 132 and framework 150. Rod 130b of lift mechanism 130 connects to one area of connecting member 132a, and another area of connecting member 132a connects to side members 132b of upper lift frame 132. Rod 130b may be connected to connecting member 132a by any number of ways, such as permanent welded connection, a bolt, screw, cotter pin, and the like.

As shown in FIGS. 2 and 3, side members 132b may be configured so that a rod shaped member, such as rod shaped member 133, connects side members 132b to one another and provides a manner in which link member 131f can connect lower lift frame 131 to upper lift frame 132.

As shown in FIG. 1, side members 132b may run parallel to framework 150 and connect to cylindrical member 132c. In one embodiment, cylindrical member 132c may be a hollow cylindrical member that is arranged so that rod member 132d is positioned inside of cylindrical member 132c and may extend out of cylindrical member 132c. Rod member 132d mounts to lifting mechanism-framework mount 153 in order to hold rod member 132d and to keep 132c connected between lifting mechanism-framework mounts 153. Cylindrical member 132c is configured so that it has a diameter larger than the diameter of rod member 132d so that cylindrical member 132c can move around rod member 132d, such as when lift mechanism 130 is moving framework 150, and so that rod member 132d can be easily removed from cylindrical member 132c.

Framework support 135 is a support device that adds additional support to framework 150 and helps to enable framework 150 to be moved, raised, lowered, tilted, de-tilted, and the like with the use of lift mechanism 130, lower lift frame 131, and upper lift frame 132. As illustrated in FIGS. 1 and 3, framework support 135 includes a right member 135a and a left member 135b. In one embodiment, one end of framework support 135 is mounted to member 110 through mounts 136 and the opposite end of framework support 135 is mounted to framework 150 through framework mounts 138. Mounts 136 and 138 are preferably pivot mounts that allow the items connected into the mounts to pivot or move in mounts 136 and 138. However, the present invention is not limited to this configuration as mounts 136 and/or mounts 138 may be non-pivoting mounts.

As illustrated in FIGS. 1, 2, and 3, the present invention may be configured so that framework support 135 includes rods 137 and 139 that are located at each end of framework support 135. Rods 137 and 139 may be configured to provide a mounting location for framework support 135 so that rod 137 fits into mounts 136 and rod 139 fits into mounts 138. In one embodiment, mounts 136 and 138 are pivot mounts so that rods 137 and 139 can pivot or move in mounts 136 and 138.

Although FIG. 1 illustrates rods 137 and 139 as extending longitudinal from one mount to another mount, the present invention is not limited to this configuration. The present invention may also be configured so that rods 137 and 139 do not extend from one mount to the other mount but the rods may be configured so that it can fit into mounts 136 and 138 but the rods do not continually extend longitudinal between mounts 136 and between mounts 138.

An embodiment of the present invention may also include sliding mechanism 140, clearly shown in FIG. 2. Sliding mechanism 140 is a device that may be configured so that part of sliding mechanism 140 is connected to base member 110 and another part of sliding mechanism 140 is connected to base member 120. Sliding mechanism 140 can expand and/or retract depending on the operation of lift mechanism 130. Sliding mechanism 140 may comprise a sliding member 140a, illustrated in FIG. 2, and a receiving member 140b, illustrated in FIG. 1. In one embodiment sliding member 140a and receiving member 140b may be two separate pieces and in another embodiment sliding mechanism 140 may be configured so that sliding member 140a and receiving member 140b are one piece that may collapse into one another in a telescoping fashion. Sliding member 140a may be connected to base member 120 and receiving member 140b may connect to base member 110. The sliding member 140a may be an object, either hollow or solid, of any number of different shapes, such as cylindrical, rectangular, octagonal, triangular, and the like that is capable of moving into receiving member 140b. Sliding member 140a is not limited to any particular type of material as it may comprise any number of different materials, such as metal, wood, plastic, iron, aluminum, and the like.

Receiving member 140b is preferably a hollow object that is capable of receiving sliding member 140a as lift mechanism 130 operates to move framework 150. Receiving member 140b may also take the form of any number of shapes, such as cylindrical, rectangular, octagonal, triangular, and the like and is not limited to any particular type of material as it may comprise any number of different materials, such as metal, wood, plastic, iron, aluminum, and the like. In a preferred embodiment, receiving member 140b will be a hollow member that is the same shape as sliding member 140a so that when lift mechanism 130 moves framework 150, sliding member 140a can move into or out of receiving member 140b with little to no friction. However, the present invention is not limited to this embodiment, as any number of configurations is permissible as long as sliding member 140a and receiving member 140b can move into or out of or away from one another as lift mechanism 130 operates. For example, in one embodiment, sliding member 140a may be a hollow member that is larger than receiving member 140b and receiving member 140b may be a solid member smaller than sliding member 140a whereby sliding member 140a will slide over or outside of receiving member 140b when lift mechanism 130 operates.

In one embodiment, when lift mechanism 130 is activated so that rod 130b extends out of the cylinder 130a and elevates framework 150 in an outward or titled manner, wheels 111 and 121 will move towards one another so that the length between base members 110 and 120 will decrease and sliding mechanism 140 will retract with sliding member 140a moving into receiving member 140b or sliding member 140a moving over or outside of receiving member 140b.

When lift mechanism 130 is activated so that rod 130b retracts into cylinder 130a, framework 150 will move in a downward direction. In such a case, wheels 111 and 121 will move apart from one another so that the length between base members 110 and 120 will increase and sliding mechanism 140 will protract with sliding member 140a moving away from or out of receiving member 140b. Sliding mechanism 140 will expand thereby causing base members 110 and 120 to move apart from one another.

The present invention may also include pump 160, as illustrated in FIG. 1. Pump 160 is utilized to operate lift mechanism 130. Pump 160 is preferably a hydraulic pump that is used to operate lift mechanism 130. The present invention is not limited to any particular type or size of pump as pump 160 may be any size or type of pump that can operate lift mechanism 130.

In another embodiment, the present invention may include another machine or device instead of or in addition to pump 160 that can be used to activate lift mechanism 130. For example, the present invention may include a motor, a self cranking device, a foot pedal, and the like that can be used to activate lift mechanism 130.

An embodiment of the present invention also includes a power supply, such as power supply 170 illustrated in FIG. 2. Power supply 170 may be utilized to provide power to any number of devices that may be part of, installed on, or used with tilting bed-cart/truck 100. In one embodiment, power supply 170 provides a source of power to operate pump 160. Power supply 170 may be a battery. However, the present invention is not limited to this configuration as power supply 170 may be any number of power supplies capable of providing power, such as a battery, a solar power supply, an electrical cord for connection to an outlet, and the like.

In one embodiment, the present invention may be configured to include carriage 165, as shown in FIGS. 1 and 2. Carriage 165 is a device utilized to hold pump 160, power supply 170, and any number of additional devices, to tilting bed-cart/truck 100. As illustrated in FIGS. 1 and 2, carriage 165 may be a half-box shaped device that functions to hold various items, such as pump 160 and power supply 170. Carriage 165 is not limited to the illustrations show in FIGS. 1 and 2 as it may take the form of any number of shapes and may be made of any number of materials, such as wood, steel, iron, aluminum, chrome, plastic, and the like. Pump 160 and power supply 170 may be mounted to carriage 165 or may simply sit in carriage 165.

The present invention may also include control station 180 as illustrated in FIG. 2. Control station 180 may provide a means for a user to control the present invention. In one embodiment, control station 180 may include a start button and a stop button that may be used to start and stop the operation of lift mechanism 130, to activate or de-activate any braking mechanism that may be installed on wheels 111 and 121, to activate any motor mechanism that may move wheels 111 and 121, and/or to activate or de-activate any braking mechanism that may be installed on lift mechanism 130 to prevent it from moving any further. Control station 180 may also be configured such that it is mounted to one of members 110 and 120 for use by a user's foot. In another embodiment, control station 180 may be configured so that it is a remote control device. In such an embodiment, the remote control may be hard wired or wireless. In a wireless configuration, control station 180 may comprise a remote device that a user may uses to send control signals and a signal receiving device for receiving the signals sent by the remote device. The signal receiving device may also operate to receive the signals and pass the signals on, either as the same signal or as a new signal, so that a user can operate and control the present invention. However, the present invention is not limited to this configuration, as the control station may be configured in any number of ways so that a user is able to control tilting bed-cart/truck 100.

One embodiment of the present invention may also include various safety devices to assist in keeping use of the present invention safe. For example, a buzzer may be installed to make noise when framework 150 is moved, either in an elevated or de-elevated direction. A buzzer may also be installed to make a sound when tilting bed-cart/truck 100 is in the process of being rolled in either a forward or backward direction. The present invention is not limited to the foregoing safety devices as any number of safety devices may be used to increase safety, such as blinking lights, wheel brakes, brakes on lift mechanism 130 to ensure that framework 130 does not fall, a weight sensor to detect when the objects placed upon framework 150 are too heavy, a power indicator to indicate when power is low, and the like.

The present invention is not limited to any range of movement or elevation of an object on framework 150. For example, the present invention may be configured so that lift mechanism 130 and the surrounding components can operate to move, lift, elevate, tilt, de-elevate, and/or de-tilt framework 150 and any objects on framework 150 to any number of degrees of movement, such as 30 degrees movement, 45 degrees movement, 60 degrees movement, 90 degrees of movement, 180 degrees of movement (so that framework 150 and any objects located on framework 150 are laying flat and parallel to the ground, and the like.

A technical advantage of the present invention is that as an object on framework 150 is moved, in either an elevated/tilted direction or in a de-elevated or de-tilted direction through the activation of lift mechanism 130, the center of the load of the object on framework 150 will continue to stay between base members 110 and 120 and between wheels 111 and 121. The present invention will function to maintain the load center between the wheels because as an object on framework 150 is tilted and/or moved in an upward or elevated direction, base members 110 and 120 move towards one another through wheels 111 and 121 whereby the center of the load of an object on framework 150 will stay between base members 110 and 120 and wheels 111 and 121. In addition, as an object on framework 150 is de-tilted and/or moved in an downward or de-elevated direction, base members 110 and 120 move away from one another through wheels 111 and 121 whereby the center of the load of an object on framework 150 will stay between base members 110 and 120 and wheels 111 and 121 By maintaining the load center between the base members 110 and 120, the present invention provides load stability throughout the entire range of movement of an object on framework 150.

Another advantage is that the overall length of tilting bed-cart/truck 100 when framework 150 is elevated to an upright limit is shorter than the overall length of tilting bed-cart/truck 100 when framework 150 and any object on framework 150 is moved to its lowest non-elevated position. By decreasing the overall length of tilting bed-cart/truck 100, it is easier to move objects with the present invention in areas characterized by dimension restrictions, such as an elevator designed for people, hallways, door entry ways, and the like. For example, in several instances, the only way to get large flat objects, such as sheet rock, doors, plywood and the like, to the upper floors of a building is to carry these objects up the stairs. The present invention helps solve this problem as the large flat objects can be placed upon framework 150 and then framework 150 can be tilted with lift mechanism 130 so that the large flat objects are not carried parallel nor perpendicular to the ground when the objects are in the process of being moved. In tilting and/or elevating framework 150, the floor space required to carry the large objects is reduced thereby allowing various large flat objects to be transported in, around, and through limited spaces. For example, the present invention can be utilized to tilt a 3 foot by 9 foot door so that the door can be transported in an area that only requires 7 feet of length as opposed to 9 feet of length.

The present invention may also include a locking mechanism that may increase the safety of users moving objects with the present invention. A locking mechanism may operate to lock sliding mechanism 140 to prevent sliding member 140*a* and receiving member 140*b* from moving into or away from one another. For example, if the present invention were in use and a door was on framework 150 and lift mechanism was unable to hold the framework in its present tilted position, a locking mechanism could be used to prevent the sliding member 140*a* and receiving member 140*b* from moving into or away from one another so that the present invention would be able to keep the door in its present (tilted) position.

Figure 4:
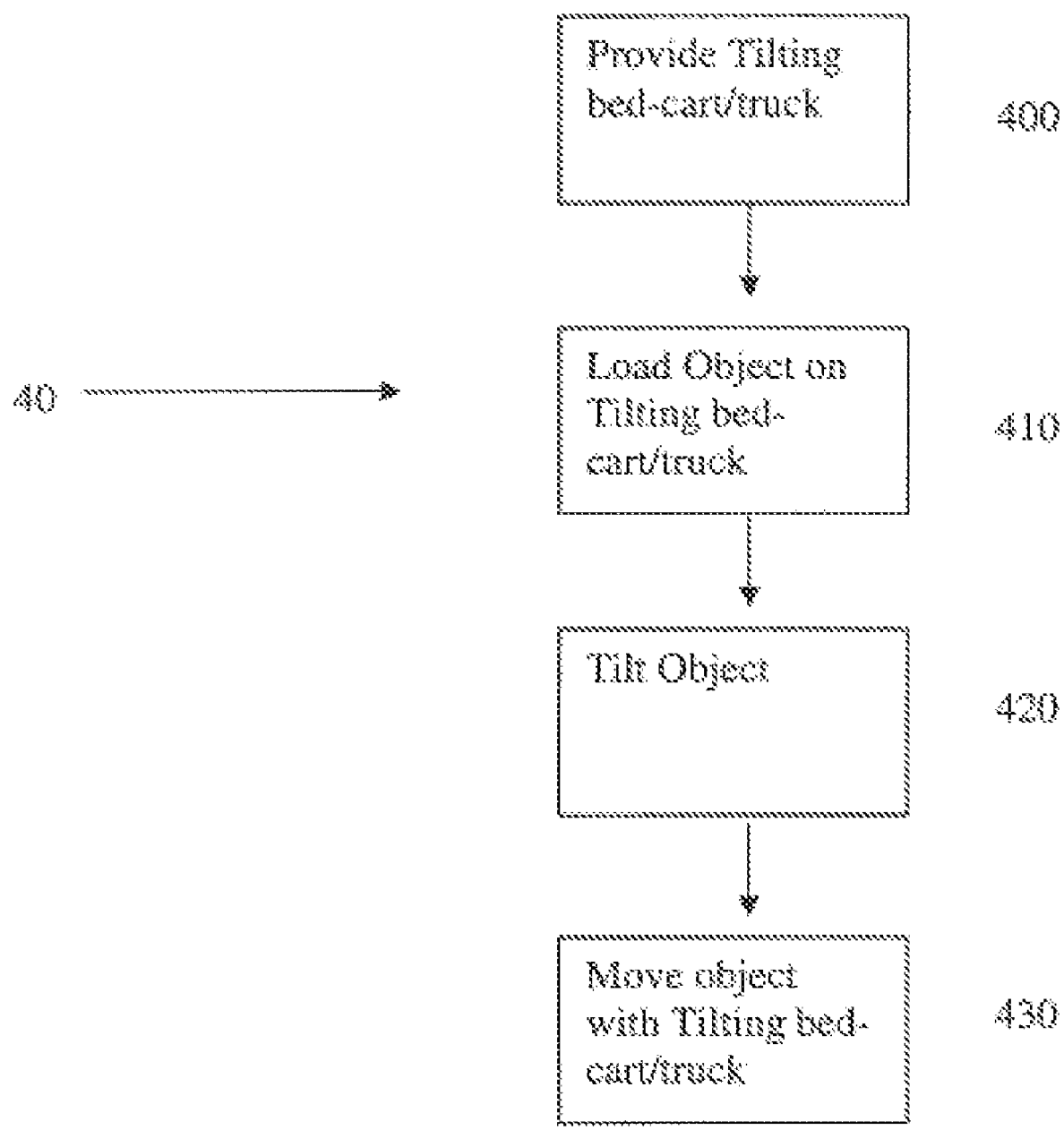
FIG. 4 illustrates a flowchart representing one method for moving objects around obstacles and/or in limited areas according to one embodiment of the present invention.

FIG. 4 illustrates a flowchart representing one method for moving objects around obstacles according to one embodiment of the present invention. Flow 40 represents a method for moving objects around obstacles. A tilting bed-cart/truck is provided in block 400. The tilting bed-cart/truck may comprise tilting bed-cart/truck 100 illustrated in FIGS. 1 and 2. After the tilting bed-cart/truck is provided, flow 40 proceeds to block 410, where an object is loaded on the tilting bed-cart/truck. For example, the object may be a door or a piece of sheet rock that is loaded on the tilting bed-cart/truck.

After the object is loaded, flow 40 proceeds to block 420. In block 420, the object is tilted. The object may either be tilted in either an upward or downward direction. For example, a user may be using the tilting bed-cart/truck to move large flat objects to an upper floor of a building by using an elevator designed for people. The user will load the object, such as a door or piece of sheet rock, and then tilt the object to a desired angle of elevation so that the object can be moved in the elevator. After block 420, flow 40 proceeds to block 430. When flow 40 proceeds to block 430, the object may be moved to its final location where it may then be moved off of the tilting bed-cart/truck. For example, after the object, such as the door, is loaded and tilted, a user will use the tilting bed-cart/truck to move the object, via the wheels on the cart, to the desired location. When the object, such as a door, is moved via the tilting bed-cart/truck to its final destination, then the object may be unloaded and/or moved off of the tilting bed-cart/truck.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A system for moving objects comprising:
   a first base member;
   a second base member;
   a framework for holding objects;
   a lift mechanism, wherein said lift mechanism moves said framework when said lift mechanism is activated;
   a device for activating the lift mechanism;
   a support member for supporting said framework;
   a lower lift frame, wherein said tower lift frame comprises:
      a right member;
      a left member;
      a bottom member;
      a top member; and
      a link member;
   an upper lift frame;
   one or more wheels attached to said first base member;
   one or more wheels attached to said second base member;
   a sliding mechanism, wherein said sliding mechanism comprises:
      a sliding member; and
      a receiving member.

2. The system of claim 1 wherein when said lift mechanism is activated to move said framework, any objects on said framework can be positioned so that said objects are neither perpendicular nor parallel to the ground.

3. The system of claim 1 wherein when said framework is positioned parallel to the ground said system has a first overall length and when said lift mechanism is activated and said lift mechanism moves said framework so that said framework is not parallel to the ground, said system has a second overall length that is smaller than said first overall length.

4. The system of claim 1 wherein when said lift mechanism is activated to move said framework, said framework can be positioned so that said framework is neither perpendicular nor parallel to the ground.

5. The system of claim 1 wherein when said lift mechanism is activated to move said framework in an upward direction said first base member and said second base member move toward one another so that the load center of an object on said framework is maintained between said first base member and said second base member; and
   when said lift mechanism moves said framework in an downward direction said first base member and said second base member move away from one another so that the load center of an object on said framework is maintained between said first base member and said second base member.

6. The system of claim 1 wherein said lift mechanism is a hydraulic cylinder comprising:
a cylinder; and
a rod.

7. The system of claim 6 wherein said device for activating said lift mechanism is a pump.

8. The system of claim 7 further comprising:
a power supply for activating said pump.

9. The system of claim 8 wherein said cylinder connects to said lower lift frame and said rod connects to said upper lift frame.

10. The system of claim 8 wherein said upper lift frame comprises:
one or more side members; and
a cylindrical member attached to an end of said one or more side members.

11. The system of claim 10 further comprising a connecting member wherein one end of said connecting member attaches to said rod of said hydraulic cylinder and another end of said connecting member attaches to said one or more side members.

12. The system of claim 10 wherein one end of said link member attaches to said top member of said lower lift frame and another end of said link member attaches to said one or more side members.

13. The system of claim 12 whereby said link member allows said lower lift frame and said upper lift frame to move relative to one another when said lift mechanism is activated.

14. A cart for maintaining the load center of an object on said cart comprising:
a first base member with one or more wheels;
a second base member with one or more wheels;
a framework for holding objects;
a moveable mechanism that connects said first base member to said second base member whereby said moveable mechanism collapses when said first base member and said second base member move towards one another and opens up when said first base member and said second base member move apart from one another; and
a lift mechanism for moving said framework;
a device for activating said lift mechanism
a moveable support member for supporting said framework whereby said moveable support member moves when said lift mechanism moves said framework whereby:
when said lift mechanism moves said framework in an upward direction said first base member and said second base member move toward one another so that the load center of an object on said framework is maintained between said first base member and said second base member; and
when said lift mechanism moves said framework in an downward direction said first base member and said second base member move away from one another so that the load center of an object on said framework is maintained between said first base member and said second base member.

15. The cart of claim 14 further comprising:
a lower lift frame; and
an upper lift frame whereby said lower lift frame and said upper lift frame are connected to one another.

16. The cart of claim 15 wherein said lower lift frame is further connected to said first base member or said second base member and said upper lift frame is further connected to said framework so that when said lift mechanism is activated said lift mechanism will move said upper lift frame resulting in movement of said framework.

17. The cart of claim 16 wherein said lift mechanism is a hydraulic cylinder lift comprising an extending member and a cylinder member.

18. The cart of claim 17 wherein said device for activating said lift mechanism comprises:
a pump to activate said hydraulic cylinder; and
a power source to activate said pump.

19. The cart of claim 18 further comprising a motor for moving said wheels and a power source for activating said motor.

20. The cart of claim 19 further comprising brakes to stop said wheels.

21. The cart of claim 20 further comprising a control station whereby said control station controls one or more of said pump, said brakes, and said hydraulic cylinder.

22. A method for moving objects comprising:
providing a system for moving objects wherein said system comprises:
a first base member;
a second base member;
a lift mechanism;
a device for activating said lift mechanism;
a framework for holding objects;
a support member for supporting said framework; and
one or more wheels connected to said first base member and said second base member; and
placing an object on said framework;
activating said lift mechanism to move said framework wherein when said lift mechanism is activated to move said framework in an upward direction said first base member and said second base member move toward one another so that the load center of an object on said framework is maintained between said first base member and said second base member; and
when said lift mechanism moves said framework in an downward direction said first base member and said second base member move away from one another so that the load center of an object on said framework is maintained between said first base member and said second base member; and
moving said system for moving objects.

23. The method of claim 22 wherein said lift mechanism is a hydraulic cylinder.

24. The method of claim 23 wherein said device for activating said lift mechanism is a pump.

25. The method of claim 24 wherein said system further comprises:
a lower lift frame; and
an upper lift frame whereby said lower lift frame and said upper lift frame are connected to one another.

26. The method of claim 22 wherein when said lift mechanism is activated said framework can be positioned so that restrictions to moving an object in confined spaces imposed by the overall dimensions of an object on said framework can be avoided thereby enabling the movement of said object in said con fined spaces.

* * * * *